United States Patent
Kim et al.

(10) Patent No.: US 6,332,079 B1
(45) Date of Patent: Dec. 18, 2001

(54) SERVICE AREA EXPANSION METHOD FOR MOBILE COMMUNICATION SYSTEM AND METHOD OF PROCESSING CALLS BETWEEN SERVICE AREAS

(75) Inventors: Tae-Hoon Kim, Kyonggi-do; Jae-Hoon Kim, Seoul; Joon-Sun Uhr, Kyonggi-do, all of (KR)

(73) Assignee: Hyundai Electronics Industries Co., Ltd., Kyonggi-Do (KR)

( * ) Notice: Subject to any disclaimer, the term of this patent is extended or adjusted under 35 U.S.C. 154(b) by 0 days.

(21) Appl. No.: 09/526,599

(22) Filed: Mar. 16, 2000

(30) Foreign Application Priority Data

Mar. 16, 1999 (KR) ................................................ 99-8778
Mar. 16, 1999 (KR) ................................................ 99-8779

(51) Int. Cl.[7] .................................................... H04Q 7/20
(52) U.S. Cl. ................ 455/446; 455/434; 455/436; 455/442; 455/440; 370/331; 370/519; 370/350
(58) Field of Search ................................ 455/446, 434, 455/436, 442, 440, 432, 515, 509, 557, 558; 370/331, 519, 350

(56) References Cited

U.S. PATENT DOCUMENTS

| 5,109,390 | * | 4/1992 | Gilhousen et al. ................. 375/1 |
| 5,828,661 | * | 10/1998 | Weaver, Jr. et al. ............. 370/331 |
| 5,841,767 |   | 11/1998 | Nishi et al. . |
| 5,926,470 | * | 6/1999 | Tiedemann, Jr. ................. 370/334 |
| 5,930,722 | * | 7/1999 | Han et al. ......................... 455/502 |
| 5,999,816 | * | 12/1999 | Tiedemann, Jr. et al. ........ 455/437 |
| 6,216,004 | * | 4/2001 | Tiedemann, Jr. et al. ........ 455/442 |
| 6,226,283 | * | 5/2001 | Neumiller et al. ................ 370/340 |
| 6,252,861 | * | 6/2001 | Bernstein et al. ................. 370/331 |

* cited by examiner

*Primary Examiner*—William Trost
*Assistant Examiner*—Marceau Milord
(74) *Attorney, Agent, or Firm*—R. Neil Sudol; Henry D. Coleman; William J. Sapone

(57) ABSTRACT

Disclosed is a service area expansion method and a method of processing calls between service areas in a mobile communication system adopting a CDMA system like a DCS (digital cellular system) or a PCS (personal communication system), in which a reference clock is delayed and an application specific integrated circuit (ASIC) of a plurality of CSMs (cell site modems) in a base station is controlled using such a delayed reference clock so as to expand service area by each CSM ASIC unit, and a handoff area is positioned between expanded service areas so as to perform a normal call processing. A base station of a CDMA mobile communication system is provided with a plurality of CSM ASICs having the same configuration and a delayed reference clock is fed to each CSM ASIC, thus expanding service area. Such a communication service may be provided to the coastal area where a base station is easily installed. A need to install a base station to the wide area having small subscribers is eliminated, decreasing a cost for base station installation.

3 Claims, 4 Drawing Sheets

SERVICE AREA EXPANSION METHOD FOR MOBILE COMMUNICATION SYSTEM AND METHOD OF PROCESSING CALLS BETWEEN SERVICE AREAS

BACKGROUND OF THE INVENTION

1. Field of the Invention

The present invention relates to a service area expansion method for a mobile communication system and a method of processing calls between service areas. More particularly, the present invention relates to a service area expansion method and a method of processing calls between service areas in a mobile communication system adopting a CDMA (code division multiple access) system like a DCS (digital cellular system) or a PCS (personal communication system), in which a reference clock is delayed and an application specific integrated circuit (ASIC) of a plurality of CSMs (cell site modem) in a base station is controlled using such a delayed reference clock so as to expand service area by each CSM ASIC unit, and a handoff area is positioned between expanded service areas so as to perform a normal call processing.

2. Description of the Related Art

In general, as shown in FIG. 1, mobile communication system like DCS or PCS includes a mobile station 1, a base station 2 for transmitting/receiving data to/from the mobile station, a control station 3 for transmitting/receiving data to/from the base station, and an exchange station 4.

A mobile communication system having such a configuration synchronizes timing using a GPS (global position system), and terminals of mobile communications generate signals in accordance with the reference clock.

Thus-generated signals generate a phase delay by a delay in movement distance, and a correct phase tracking is required in demodulating a signal at a receiving terminal.

However, a CSM ASIC which is mounted in a channel card of the base station 2 so as to be used as a channel element has a phase tracking scope of 512PN chip (1PN chip=813 nsec) which can be converted into 125 km, i.e., distance of radio wave movement.

The above-mentioned distance is a round trip distance between the base station 2 and the mobile station 1, and a service area is a radius of 62.5 km from the base station 2 if any hardware or software-related delay does not exist.

The service area in the above-described mobile communication system is restricted within the radius of 60 km due to the limitation of CSM ASIC.

In a conventional art, a pair of CSM ASICs are employed to expand the service area without re-design of CSM ASIC.

That is, the CSM ASIC occupying a normal region within 60 km is capable of performing a phase tracking having a scope of 0 to 512PN chip, and the CSM ASIC occupying an extended region of 60 km to 120 km is provided with a reference clock delayed by 512PN chip and capable of performing a phase tracking having a scope of 512PN to 1,024 PN chip, thus expanding the service area.

As described above, a conventional art expands an overall service area by means of dividing the service area into a normal area and an extended area. However, a method of normally processing calls between service areas is required for cases where a mobile terminal moves from the normal area to the extended area, or from the extended area to the normal area.

SUMMARY OF THE INVENTION

Therefore, it is a first object of the present invention to provide a service area expansion method for a mobile communication system in which a reference clock is delayed in a base station, the reference clock and the delayed reference clock are respectively provided to corresponding CSM ASICS, and the CSM ASICs are enabled respectively so as to thereby expand the service area.

It is a second object of the present invention to provide a method of processing calls between service areas for a mobile communication system in which a handoff area is positioned between a normal area and an extended area so as to allow both two CSM ASICs to perform a phase tracking, and a call processing between service area is normally performed by using such functions as adding, dropping, swap pointing and radio wave RTD (round trip delay).

To accomplish the first object of the present invention, there is provided a service area expansion method for a mobile communication system including a TFC (time & frequency controller), a first delay for counting a system clock output from the TFC and outputting an even second clock delayed by a predetermined time in accordance with the counted value, a second delay for delaying the even second clock and the delayed even second clock output from the first delay, respectively, and generating a first and a second interrupt signals of 80 msecond ticks, a CPU for generating an interrupt using the first and second interrupt signals generated from the second delay and generating a first and a second enable signals, a normal area CSM ASIC which is enabled by the first enable signal output from the CPU, operates in accordance with the even second clock output from the TFC, and processes a call of a mobile terminal in the normal area, and an extended area CSM ASIC which is enabled by the second enable signal output from the CPU, operates in accordance with the delayed even second clock output from the first delay, and processes a call of a mobile terminal in the extended area, the method including: a first step of initializing the normal area CSM ASIC using the even second clock output from the TFC, the extended area CSM ASIC using the delayed even second clock output from the first delay in accordance with a re-synchronization command for the normal area CSM ASIC and the extended area CSM ASIC and which is output from the CPU, receiving from a control station a configuration for channel allocation for each CSM ASIC, and determining whether a channel to be allocated is a traffic channel or an access channel; a second step of setting up a pair of the two CSM ASICs to a traffic channel or an access channel if the channel to be allocated is determined as a traffic channel or an access channel in the first step, and advancing a forward timing by a delayed reference clock; and a third step of setting up only the normal area CSM ASIC to a corresponding channel if the channel to be allocated is not determined as a traffic channel or an access channel in the first step.

To accomplish the second object of the present invention, there is provided a method of processing calls between service areas for a mobile communication system in which a handoff area for a phase tracking of both normal area CSM (cell site modem) and extended area CSM is arranged between the normal area and extended area, the method including: a first step of detecting an RTD (round trip delay) value at a state where a call is normally maintained in the normal area if a mobile terminal moves from the normal area to the extended area; a second step of setting up a call to the extended area CSM ASIC and disabling an uppermost terminal for transmission/reception if the RTD value detected in the first step is Extend-Call-Add Point; a third step of enabling transmission/reception of the extended area CSM ASIC and disabling transmission/reception of the normal area CSM ASIC if the RTD value detected in the first step is Normal-Call To Extend-Call-Swap Point; and a fourth step of releasing the call by the normal area CSM ASIC and normally maintaining at the extended area the call of the mobile terminal if the RTD value detected in the first step is Normal-Call-Drop Point.

To accomplish the second object of the present invention, there is provided a method of processing calls between service areas for a mobile communication system in which a handoff area for a phase tracking of both normal area CSM (cell site modem) and extended area CSM is arranged between the normal area and extended area, the method including: a first step of detecting an RTD (round trip delay) value at a state where a call is normally maintained in the extended area if a mobile terminal moves from the extended area to the normal area; a second step of setting up a call to the normal area CSM ASIC and disabling an uppermost terminal for transmission/reception if the RTD value detected in the first step is Normal-Call-Add Point, a third step of enabling transmission/reception of the normal area CSM ASIC and disabling transmission/reception of the extended area CSM ASIC if the RTD value detected in the first step is Extend-Call To Normal-Call-Swap Point, and a fourth step of releasing the call by the extended area CSM ASIC and normally maintaining at the normal area the call of the mobile terminal if the RTD value detected in the first step is Extend-Call-Drop Point.

BRIEF DESCRIPTION OF THE DRAWINGS

The present invention will become more fully understood from the detailed description given hereinafter accompanying drawings, which are given by way of illustration only, and thus are not limitative of the present invention, and wherein.

PREFERRED EMBODIMENTS OF THE PRESENT INVENTION

The present invention will be explained in more detail with reference to the attached drawings.

First, a service area expansion method for a mobile communication system according to the first object of the present invention will be explained in detail.

In the present invention, communication service area is divided into two (or more) service areas. The two service areas are referred to as a normal area and an extended area.

CDMA system has at a forward link a pilot channel, a synchronous channel, paging channel, forward traffic channel, and at a reverse link an access channel and a reverse traffic channel. In the present invention, a reference clock of the reverse traffic channel is delayed so as to expand the service area.

Figure 1:
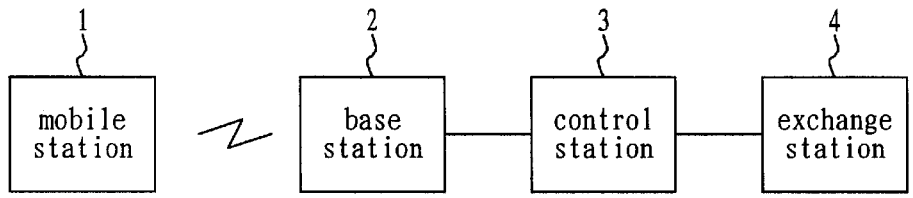
FIG. 1 is a block diagram illustrating a common mobile communication system.
Figure 2:
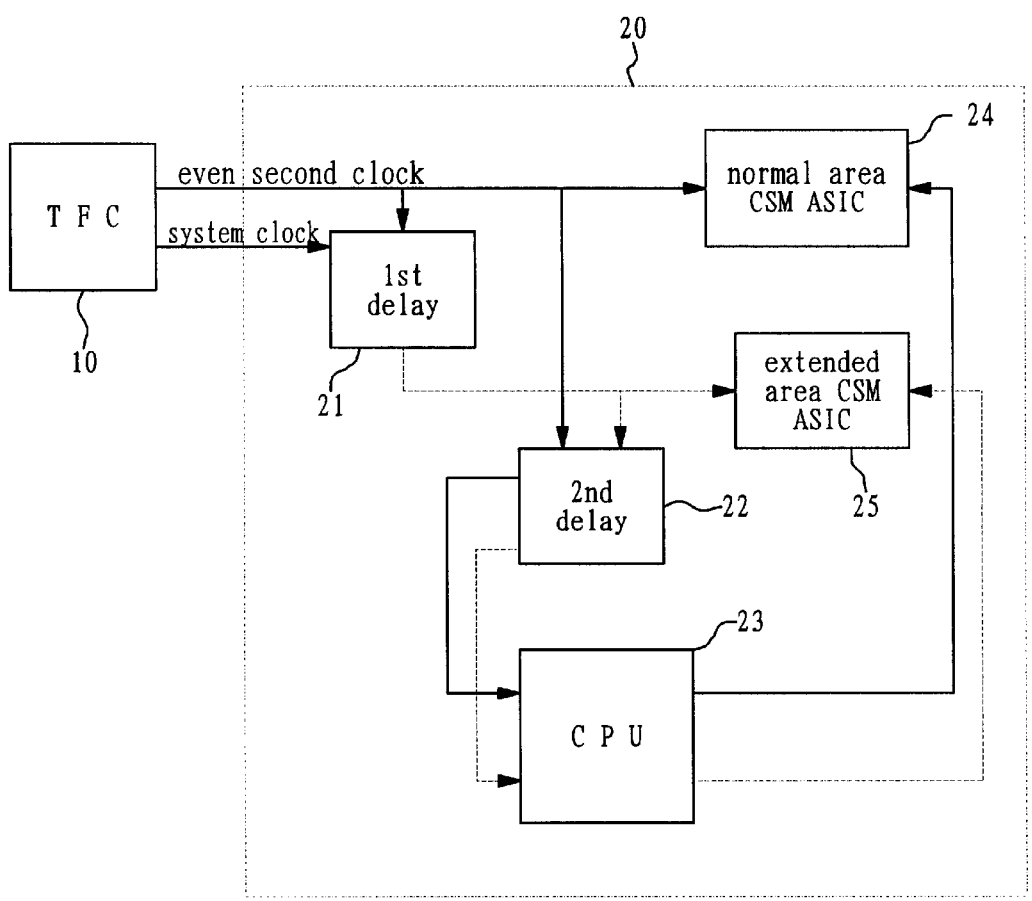
FIG. 2 is a block diagram illustrating a service area expansion apparatus adopting a service area expansion method for a mobile communication system according to a first embodiment of the present invention.

FIG. 2 is a block diagram illustrating a service area expansion apparatus adopting a service area expansion method for a mobile communication system according to the present invention.

Referring to FIG. 2, the service area expansion apparatus includes a TFC (time & frequency controller) 10 and a channel card 20.

The channel card 20 includes a first delay 21 for counting a system clock output from the TFC 10 and outputting an even second clock delayed by a predetermined time in accordance with the counted value, a second delay 22 for delaying the even second clock and the delayed even second clock output from the first delay 21, respectively, and outputting a first and a second interrupt signals of 80 msecond ticks, a CPU 23 for generating an interrupt using the first and second interrupt signals output from the second delay 22 and generating a first and a second enable signals, a normal area CSM ASIC 24 which is enabled in accordance with the first enable signal generated from the CPU 23, operates in accordance with the even second clock output from the TFC 10, and processes a call of a mobile terminal in the normal area, and a CSM ASIC 25 which is enabled in accordance with the second enable signal generated from the CPU 23, operates in accordance with the delayed even second clock output from the first delay unit 21, and processes a call of a mobile terminal in the extended area.

Thus-configured service area expansion apparatus of the present invention has a pair of CSM ASICs 24 and 25 for the normal area and extended area, respectively, in the access channel and forward/reverse traffic channel. The extended area CSM ASIC 25 is provided with the even second clock which is output as being delayed from the first delay 21. A handoff area for a signal detection of both the CSM ASICs 24 and 25 is set up to delay a reference clock, so that a call can be processed when a mobile terminal moves from the normal area to the extended area.

The even second clock delayed in the first delay 21, i.e., synchronization of the reference clock, is a clock of 19.6608 MHz received at a GPS (global positioning system), processed by the TFC 10, and input to the channel card 20.

The pair of CSM ASICs 24 and 25 used for an access channel upon an initialization of each channel occupy only a reverse link, while the pair of CSM ASICs 24 and 25 used for a traffic channel upon an initialization of each channel occupy both forward/reverse links. The extended area CSM ASIC 25 has a problem of delay up to a forward timing because of a delay of the reference clock. Therefore, it is required to advance the forward timing by the delayed time by means of adjusting a forward timing advance register.

When the mobile terminal transmits an initialization message or a page response message to a base station, the message is received at the access channel of the normal area or the extended area in accordance with the location of the mobile terminal. Therefore, it is required to allocate a traffic channel to the normal area or the extended area. If the traffic channel is allocated to the extended area, the RTD value is processed considering a delay value of the reference clock.

The CMS ASICs 24 and 25 sets up all timings using a reference clock of 80 msecond ticks synchronized with the even second clock. Specifically, the extended area CSM ASIC 25 generates and uses a delayed reference clock of 80 msecond ticks for setting up a long code and a short code.

Figure 3:
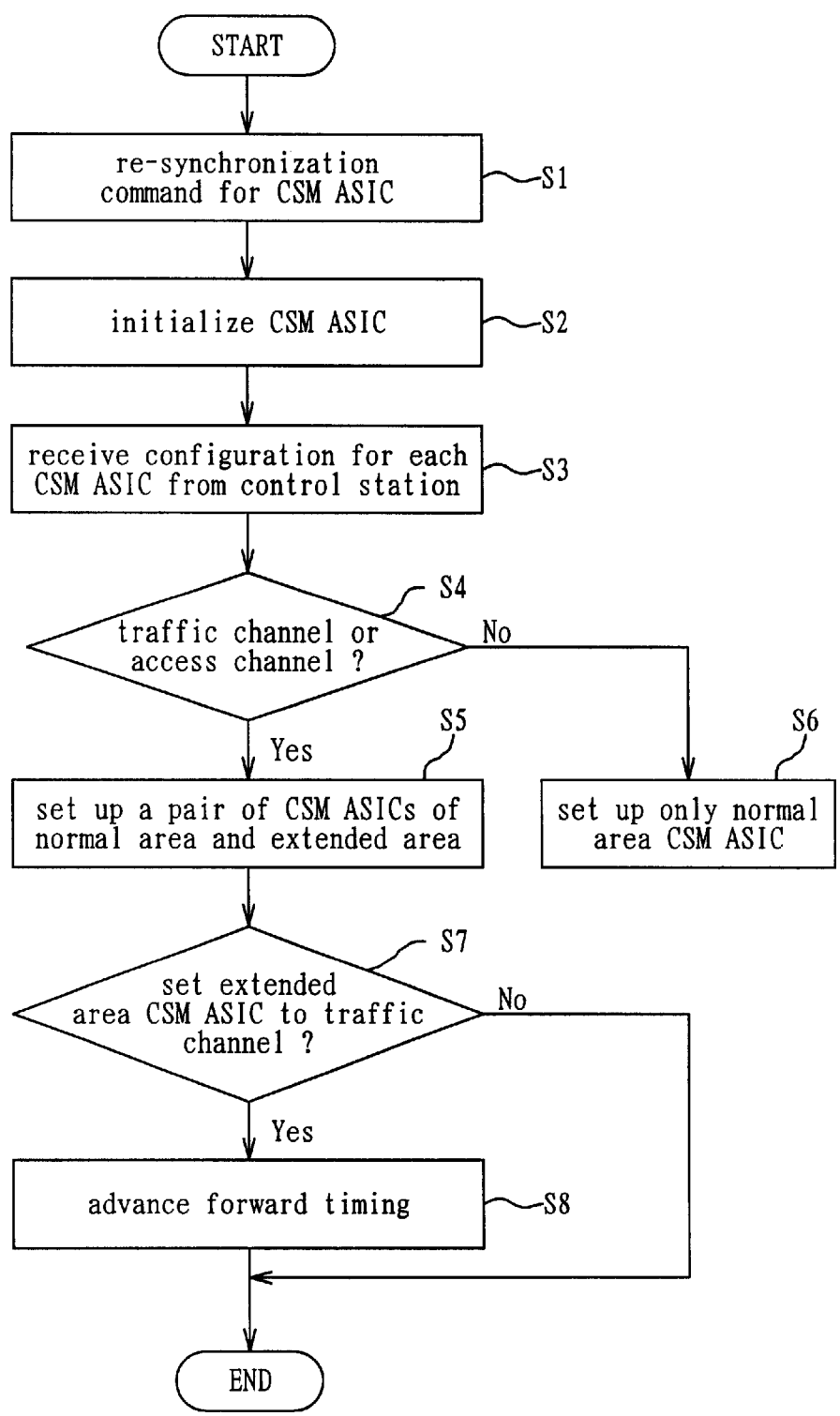
FIG. 3 is a flowchart illustrating a service area expansion method for a mobile communication system according to the first embodiment of the present invention.

A method of controlling the CSM ASIC for service area expansion for a mobile communication system according to the present invention will be explained with reference to FIG. 3.

If a re-synchronization command for a CSM ASIC is generated from an even second interrupt of the CPU 23 in step S1, CSM ASICs 24 and 15 operate synchronously with an even second clock output from the TFC 10, i.e., a reference clock.

The extended area CSM ASIC 25 is provided with a reference clock which is output to the normal area CSM ASIC 24 and delayed by the first delay 21, to thereby perform an initialization in step S2.

When the initialization of CSM ASICs 24 and 25 completes in the step S2, each CSM ASIC receives a configuration from a control station in step S3. If thus-received configuration is for a channel allocation, and if the channel to be allocated is determined as forward/reverse traffic channels or an access channel in step S4, the normal area CSM ASIC 24 and extended area CSM ASIC 25 are set up as forward/reverse traffic channels or an access channel, so that a call processing of a mobile terminal can be performed in the normal area and extended area in step S5.

If the channel to be allocated is not determined as forward/reverse traffic channels or an access channel, only the normal area CSM ASIC 24 is set to a corresponding channel in step S6.

If it is determined in step S7 that the extended area CSM ASIC 25 is set to a traffic channel in step S5, a forward timing is advanced by an amount corresponding to the delay of the reference clock in step S8.

The reference clock is delayed upon initialization of the extended area CSM ASIC 25 of step S2, which causes another delay in the forward timing. Therefore, a forward timing advance register is adjusted so as to advance the forward timing by the delayed amount.

As described above, after the configuration of CSM ASICs 24 and 25 completes, the extended area CSM ASIC 25 may provide a delayed long code using the reference clock of 80 mseconds which is delayed upon setting up the long code of the access channel, similarly to the long code provision of the normal area CSM ASIC 24.

Figure 4:
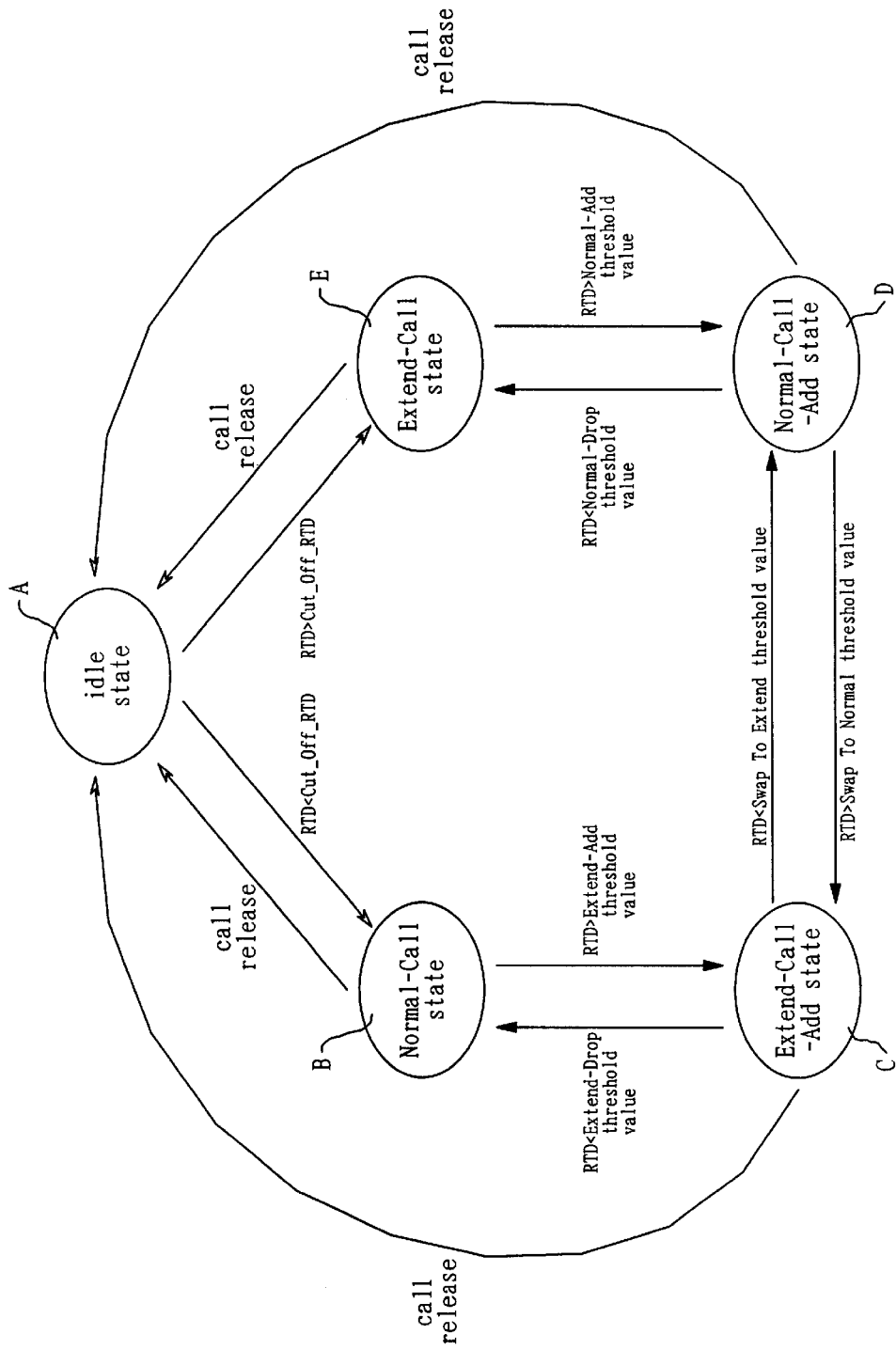
FIG. 4 illustrates a method of processing calls between service areas for a mobile communication system according to a second embodiment of the present invention.
Figure 5:
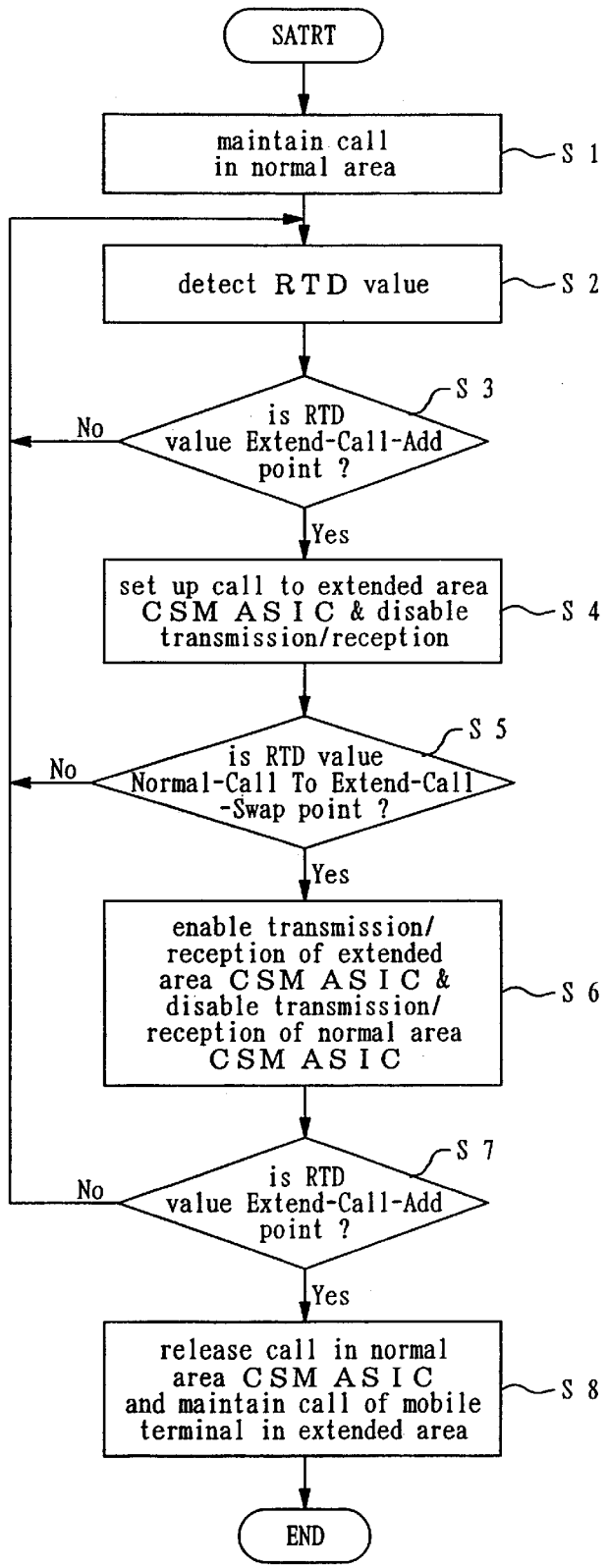
FIG. 5 is a flowchart illustrating a method of processing calls between service areas for a mobile communication system according to the second embodiment of the present invention.

A method of processing calls between service areas in a mobile communication system according to the second object of the present invention will be explained with reference to FIGS. 4 and 5.

Here, the service area is divided into a normal area, handoff area, and an extended area.

The handoff area is one where a reference clock which is to be supplied to the extended area CSM ASIC and delayed by a predetermined value to be less than 512PN chip is provided.

In the present invention, Extend-Call-Add Point, Normal-Call To Extend-Call-Swap Point, and Normal-Call-Drop Point are set if a mobile terminal moves from the normal area to the extended area using the RTD. Normal-Call-Add Point, Extend-Call To Normal-Call-Swap Point, and Extend-Call-Drop Point are set if the mobile terminal moves from the extended area to the normal area.

The access channel of the handoff area is processed as an access channel of the normal area if it is less than the intermediate of the RTD value, and processed as an access channel of the normal area if it is larger than the intermediate of the RTD value.

It is required to set each point for handoff to have a value sufficient to prevent a ping-ponging situation which may be caused by a frequent call processing when a mobile terminal moves within a handoff area.

The handoff as referred in the present invention is not defined IS-95-A or J-STD-008 but defined in accordance with the service area expansion. Whether or not to perform handoff is determined by an RTD value in a channel card in a base station. There are various types of handoff as follows.

Region Add
   Normal-Call-Add
   Extend-Call-Add

Region Swap
   Normal-Call To Extend-Call-Swap
   Extend-Call To Normal-Call-Swap Region Drop
   Normal-Call-Drop
   Extend-Call-Drop A method of processing calls between service areas in a mobile communication system according to the present invention will be explained with reference to FIG. 5.

First, at a state where a mobile terminal normally maintains a call in a normal area in step S1, an RTD value is detected in step S2.

Here, handoff is not detected by the mobile terminal, and the RTD value is detected by a channel card in a base station so as to determine whether handoff between service areas is required or not.

If the RTD value detected in step S2 is determined as Extend-Call-Add Point in step S3, a call is set up to an extended area CSM ASIC, and transmission/reception is disabled in step S4.

If the RTD value detected in the step S2 is determined as Normal-Call To Extend-Call-Swap Point in step S5, transmission/reception of the extended area CSM ASIC is enabled while the normal area CSM ASIC is disabled in step S6.

If the RTD value detected in step S2 is determined as Normal-Call-Drop Point in step S7, the normal area CSM ASIC performs, a call release and the extended area normally maintains a call of the mobile terminal in step S8.

If the RTD values are not determined as those Points in steps S3, S5, and S7, the RTD value is continuously detected.

The above-described operation is a call processing procedure, i.e., handoff for cases where a mobile terminal moves from the normal area, handoff area and finally to the extended area. Since the call processing procedure when the mobile terminal moves from the extended area to the normal area is similar to the above-described processing procedure, the detailed explanation thereof will be omitted.

Method of processing calls between service areas will be explained in more detail with reference to FIG. 4.

The mobile terminal requests a call in the normal area, and if the RTD value is less than cut-off RTD value (if RTD<Cut_Off_RTD), an idle state (A) is converted to Normal-Call state (B). If the RTD value is greater than Extend-Add threshold value (if RTD>Extend_Add_Threshold) at Normal-Call state (B), Extend-Call is set up and added, and the Normal-Call state is converted to Extend-Call-Add state (C).

If the RTD value is greater than Swap To Extend threshold value (if RTD>Swap_To_Extend_Threshold) at Extend-Call-Add state, Extend-Call is activated, and the Extend-Call-Add state is converted to Normal-Call-Add state (D).

If the RTD value is less than Extend-Drop threshold value at Extend-Call-Add state (if RTD<Extend_Drop_Thresh), Extend-Call is dropped, and the Extend-Call-Add state is converted to Normal-Call state (B).

If the RTD value is less than Swap To Normal threshold value (if RTD<Swap_To_Normal_Threshold) at Normal-Call-Add state (D), Normal-Call is activated, and the Normal-Call-Add state (D) is converted to Extend-Call-Add state (C).

If the RTD value is greater than Normal-Drop threshold value (if RTD>Normal_Drop_Thresh) at Normal-Call-Add state (D), Normal-Call is dropped and Normal-Call-Add state (D) is converted to Extend-Call state (E).

When the mobile terminal moves from the normal area to the extended area, only a forward traffic for the activated call is enabled. In addition, the reverse traffic only for the activated call is transmitted to the control station.

As described above, the present invention is advantageous in that a base station of a CDMA mobile communication system is provided with a plurality of CSM ASICs having the same configuration and a delayed reference clock is fed to each CSM ASIC, thus expanding service area. Thus, a communication service may be provided to the coastal area where a base station is easily installed. In addition, a need to install a base station to the wide area having small subscribers is eliminated, decreasing a cost for base station installation.

The present invention is further advantageous in that a handoff area is arranged between a normal area and an extended area, so that a normal call processing can be maintained even during a handoff between service areas. As a result, call disconnection is reduced and a communication service quality is enhanced.

What is claimed is:

1. A service area expansion method for a mobile communication system including a TFC (time & frequency controller), a first delay for counting a system clock output from said TFC and outputting an even second clock delayed by a predetermined time in accordance with the counted value, a second delay for delaying said even second clock and said delayed even second clock output from said first delay, respectively, and generating a first and a second interrupt signals of 80 msecond ticks, a CPU for generating an interrupt using said first and second interrupt signals generated from said second delay and generating a first and a second enable signals, a normal area CS;M ASIC which is enabled by the said enable signal output from said CPU, operates in accordance with said even second clock output from said TFC, and processes a call of a mobile terminal in said normal area, and an extended area CSM ASIC which is enabled by said second enable signal output from said CPU, operates in accordance with said delayed even second clock output from said first delay, and processes a call of a mobile terminal in said extended area, said method comprising:
    a first step of initializing said normal area CSM ASIC using said even second clock output from said TFC, said extended area CSM ASIC using said delayed even second clock output from said first delay in accordance with a re-synchronization command for said normal area CSM ASIC and extended area CSM ASIC and which is output from said CPU, receiving from a control station a configuration for channel allocation for each CSM ASIC, and determining whether a channel to be allocated is a traffic channel or an access channel;
    a second step of setting up a pair of said two CSM ASICs to a traffic channel or an access channel if said channel to be allocated is determined as a traffic channel or an access channel in said first step, and advancing a forward timing by a delayed reference clock; and
    a third step of setting up only said normal area CSM ASIC to a corresponding channel if said channel to be allocated is not determined as a traffic channel or an access channel in said first step.

2. A method for processing a call in which there are provided a plurality of CSM ASIC in a base station, a current region controlled by one CSM ASIC being defined as a basic region, another region controlled by another CSM ASIC being defined as an extended region for thereby processing a handoff between the basic region and the extended region, said method comprising:
    a first step for defining an idle state in which a handoff does not occur, a basic call state for processing a handoff call in a basic region CSM, an extended call state for processing a handoff call in an extended region CSM, an extended call add state in which an extended region is added in the basic region and a basic cell add state in which a basic region is added in the extended region;
    a second step for defining a cutoff RTD value which is a reference value for judging an occurrence state of a handoff, an extended add critical value which is a reference value for judging an add state of an extended region, an exchange and extended critical value which is a reference value for judging an extended state of a handoff of the basic region CSM and extended region CSM, an exchange and basic critical value which is a reference value for judging an exchanged state of a handoff call control of the extended region CSM and basic region CSM, and a basic add critical value which is a critical value for judging an add state of the basic region;
    a third step for changing to a basic call state when a RTD value detected from a signal from a mobile station in an idle state of the handoff exceeds a cutoff RTD value;
    a fourth step for changing to an extended call add state when the RTD value exceeds an extended add critical value in the basic call state;
    a fifth step for changing to a basic call add state when the RTD value exceeds an exchange and extended critical value in the extended call add state;
    a sixth step for changing to an extended call state when the RTD value exceeds a basic/drop critical value in the basic call add state;
    a seventh step for changing to an extended call state when the RTD value is larger than the cutoff value in the handoff idle state;
    an eighth step for changing to the basic call add state when the RTD value is smaller than the basic add critical value in the extended call state;
    a ninth step for changing to the extended call add state when the RTD value is smaller than the exchange and basic critical value in the basic add state; and
    a tenth step for changing to the basic call state when the RTD value is smaller than the extended drop critical value in the extended add state.

3. A method of processing calls between service areas for a mobile communications system, comprising:
    providing at a single base station a first cell site modem for a normal area and a second cell site modem for an extended area different from said normal area;
    detecting a round trip delay value at a state where a call is normally maintained in said normal area if a mobile terminal moves from said normal area to said extended area;
    setting up a call to an application specific integrated circuit of said second cell site modem and disabling an uppermost terminal for transmission/reception if the detected round trip delay value attains a predetermined extend-call-add point or threshold;
    enabling transmission/reception of the application specific integrated circuit of said second cell site modem and disabling transmission/reception of an application specific integrated circuit of said first cell site modem if said detected round trip delay value attains a predetermined normal-call-to-extend-call-swap point or threshold; and releasing a call by the application specific integrated circuit of said first cell site modem and normally maintaining at said extended area said call of said mobile terminal if said detected round trip delay value attains a predetermined normal-call-drop point or threshold, the setting up of the call to the application specific integrated circuit of said second cell site modem, the enabling of transmission/reception of the application specific integrated circuit of said second cell site modem, and the releasing of the call by the application specific integrated circuit of said first cell site modem all being performed at said single base station.

* * * * *